(12) United States Patent
Ghazlane et al.

(10) Patent No.: US 9,863,320 B2
(45) Date of Patent: Jan. 9, 2018

(54) HEAT EXCHANGER FOR A TURBO ENGINE

(71) Applicant: SNECMA, Paris (FR)

(72) Inventors: Imane Ghazlane, Paris (FR); Gabriela Philippart, Paris (FR)

(73) Assignee: SNECMA, Paris (FR)

( * ) Notice: Subject to any disclaimer, the term of this patent is extended or adjusted under 35 U.S.C. 154(b) by 202 days.

(21) Appl. No.: 14/577,097

(22) Filed: Dec. 19, 2014

(65) Prior Publication Data

US 2015/0260102 A1    Sep. 17, 2015

(30) Foreign Application Priority Data

Dec. 23, 2013  (FR) ..................................... 13 63468

(51) Int. Cl.

| | |
|---|---|
| *F02C 7/14* | (2006.01) |
| *F02C 7/18* | (2006.01) |
| *F01D 25/12* | (2006.01) |
| *F28F 3/04* | (2006.01) |
| *F28D 1/02* | (2006.01) |

(Continued)

(52) U.S. Cl.

CPC .............. *F02C 7/185* (2013.01); *F01D 25/12* (2013.01); *F02C 7/14* (2013.01); *F28D 1/0233* (2013.01); *F28F 3/048* (2013.01); *F05D 2200/20* (2013.01); *F05D 2210/12* (2013.01); *F05D 2250/16* (2013.01); *F05D 2250/38* (2013.01); *F05D 2260/205* (2013.01); *F05D 2260/213* (2013.01); *F05D 2260/221* (2013.01); *F05D 2260/2214* (2013.01); *F05D 2260/22141* (2013.01); *F05D 2260/98* (2013.01); *F28D 2021/0021* (2013.01); *F28D 2021/0049* (2013.01); *F28F 3/12* (2013.01);

(Continued)

(58) Field of Classification Search

CPC .............. F28F 2215/02; F28F 2215/04; F28F 2215/06; F28F 2215/10; F28F 2215/14; F02C 7/14; F02C 7/141; F05D 2260/2214; F05D 2260/22141
USPC ................................................. 165/80.3, 80.4
See application file for complete search history.

(56) References Cited

U.S. PATENT DOCUMENTS

| | | | |
|---|---|---|---|
| 2004/0174678 A1* | 9/2004 | Kojima | ................. H01L 23/467 361/697 |
| 2005/0189099 A1 | 9/2005 | Hanin et al. | |

(Continued)

FOREIGN PATENT DOCUMENTS

EP      2 075 194 A1    7/2009

OTHER PUBLICATIONS

French Preliminary Search Report dated Oct. 2, 2014 in Patent Application No. 1363468 (with English translation of categories of cited documents).

*Primary Examiner* — William H Rodriguez
*Assistant Examiner* — Kyle Thomas
(74) *Attorney, Agent, or Firm* — Oblon, McClelland, Maier & Neustadt, L.L.P.

(57) ABSTRACT

The invention relates to a heat exchanger of an air circulation channel of a turbomachine, the heat exchanger being configured so as to have fluid to be cooled passing through it and including a plurality of fins protruding from a support surface, the heat exchanger being characterized in that each fin includes a base and a preferably continuous leading face which extends axially from the base in the air circulation direction while tapering from upstream to downstream along an axis parallel with the support surface.

12 Claims, 3 Drawing Sheets

(51) Int. Cl.
 *F28F 3/12* (2006.01)
 *F28D 21/00* (2006.01)
(52) U.S. Cl.
 CPC ......... *F28F 2215/00* (2013.01); *Y02T 50/671* (2013.01); *Y02T 50/675* (2013.01)

(56) References Cited

U.S. PATENT DOCUMENTS

| | | | |
|---|---|---|---|
| 2008/0030957 A1* | 2/2008 | Abul-Haj | F28F 3/02 361/703 |
| 2009/0025222 A1* | 1/2009 | Miyahara | B23P 15/26 29/890.03 |
| 2009/0165995 A1* | 7/2009 | Bajusz | F01D 25/02 165/51 |
| 2012/0114467 A1 | 5/2012 | Elder | |
| 2012/0114468 A1 | 5/2012 | Elder | |
| 2012/0255311 A1* | 10/2012 | Miyake | F23R 3/005 60/806 |
| 2013/0152392 A1 | 6/2013 | Swinford | |
| 2014/0027102 A1* | 1/2014 | Antel, Jr. | B23P 15/26 165/185 |

\* cited by examiner

HEAT EXCHANGER FOR A TURBO ENGINE

GENERAL TECHNICAL FIELD

The invention relates to a heat exchanger of an air circulation channel of a turbomachine.

Such an exchanger is particularly suited for installation in a turbomachine of an aircraft, and more particularly an aircraft turbojet.

STATE OF THE ART

A turbomachine comprises numerous elements such as ball bearings supporting the shaft or shafts of the turbomachine, which need to be both lubricated and cooled. Thus, it is known to supply these elements with "cold" oil.

Thus, certain turbojets are equipped with a SACOC (surface air-cooled oil-cooler) type air-oil heat exchanger positioned in an air circulation channel of the turbojet. In this SACOC type air-oil exchanger is provided a multitude of channels wherein circulates the oil to be cooled. The exchanger includes a body topped with fins having an isosceles trapezoid profile. These fins increase the heat exchange surface area between the oil to be cooled circulating in the channels of the body and the air circulating in the air circulation channel of the turbojet. However, these fins also generate undesirable head losses.

PRESENTATION OF THE INVENTION

The invention makes it possible to improve heat exchangers of known type and relates, to this end, according to a first aspect, to the heat exchanger of an air circulation channel of a turbomachine, the heat exchanger being configured so as to have a fluid to be cooled flowing through it and includes a plurality of fins protruding from a support surface, the heat exchanger being characterized in that each fin has a base and a leading face, preferably continuous, which extends axially from the base in the direction of air circulation, tapering from upstream to downstream along an axis parallel to the support surface.

The invention is advantageously supplemented with the following features, taken alone or in any of their technically feasible combinations:
- the leading face rises from the base of the fin in contact with the support surface up to a maximum height along an axis perpendicular to the support surface;
- each fin rises from the base according to a parabolic profile defined in a median plane perpendicular to the support surface, the parabolic profile being followed by a straight profile parallel to the support surface;
- the parabolic profile is convex or concave;
- each fin extends from a leading edge incident to the fluid to be cooled, the leading edge being defined by a conic function having a tangent at the base forming a positive angle with an axis perpendicular to the support surface;
- the positive angle with an axis perpendicular to the support surface is comprised between 0° and 60°, typically equal to 30°;
- each fin tapers along an axis z perpendicular to the support surface according to the function $f(x, z)=b/2*(1-z/h)^2+g(x, z)+\text{const}$, where $g(x, z)=a/2*(1-x/L)^2 \cdot \delta(z,h)$ is the taper along an axis x parallel to the air flow direction, y is an axis perpendicular to the air flow direction and parallel to the support surface, L is the axial length of a fin, b is the width of the base of the fin, h is the maximum height of the fin;
- the base of each fin is rectangular.

According to a second aspect, the invention relates to a turbomachine including a heat exchanger according to one of the preceding claims.

The turbomachine according to the second aspect advantageously includes an air circulation channel delimited between a first fixed annular structure and a second fixed annular structure, the support surface of the exchanger being one surface of one of the fixed structures.

The advantages of the invention are many.

The tapered shape of the fins, thanks to good material distribution, makes it possible to cause the temperature to vary linearly from the base of the fin to its end and from upstream to downstream along the air flow axis.

Thanks to the reduction in material, the mass of the exchanger is thus reduced. In addition, the space between fins is increased from upstream to downstream and from the base to the end. This will limit head losses. Indeed, thanks to a larger flow cross-section, the fluid decelerates compared with the prior art wherein the flow cross-section between the fins is less.

PRESENTATION OF THE FIGURES

Other features, aims and advantages of the invention will emerge from the description that follows, which is purely illustrative and not limiting, and which must be read with reference to the appended drawings wherein.

In all the figures, similar elements bear identical reference symbols.

DETAILED DESCRIPTION OF THE INVENTION

Hereafter, "turbomachine" is considered to mean any machine allowing conversion of the heat energy of a working fluid into mechanical energy by expansion of said working fluid in a turbine. More particularly, this working fluid can be a combustion gas resulting from the chemical reaction of a fuel with air in a combustion chamber. Thus turbomachines, as described here, include single-flow and bypass turbojets, turboprops, turbine engines or gas turbines, among others.

Hereafter, the terms "upstream" and "downstream" are defined in relation to the normal air circulation direction in the air circulation channel of the turbomachine. The air circulation channel is for example defined between an outer, particularly annular, fixed structure and an inner fixed annular structure of the turbomachine. Naturally, the air circulation channel can be non-annular.

Figure 1:
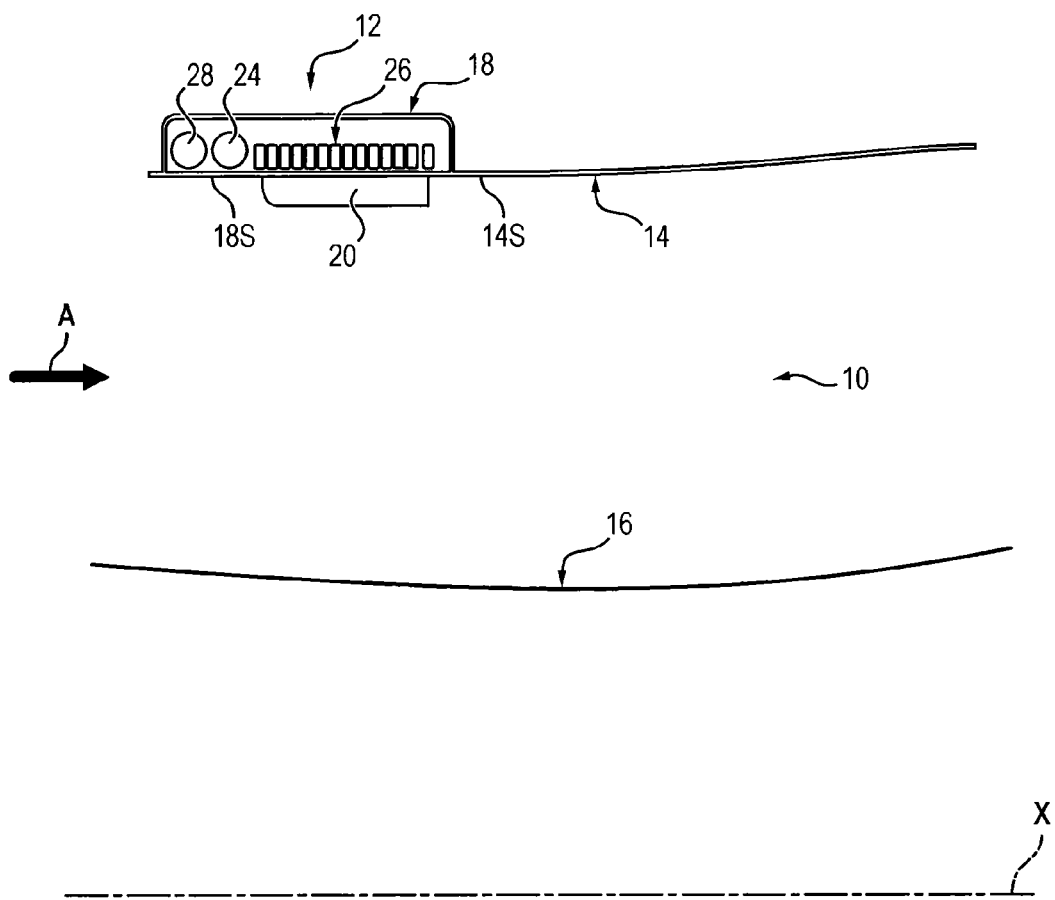
FIG. 1 illustrates a schematic view of an air circulation channel of a turbojet including a heat exchanger according to the invention.

FIG. 1 is a schematic view of an air circulation channel 10 of a turbomachine, and more precisely of an aircraft turbojet. This is a half-section axial view with respect to the principal axis X of the turbojet. The air circulation channel 10 is symmetrical or quasi-symmetrical about the axis X.

The turbojet includes a heat exchanger 12. In this example, the heat exchanger is a SACOC type air-oil heat exchanger 12. In the example, the heat exchanger 12 is positioned at the entrance of the circulation channel 10.

In addition, the turbojet includes an outer fixed annular structure 14, hereafter called "outer fixed structure" in the description, and an inner fixed annular structure 16, hereafter called the "inner fixed structure" in the description. The air circulation direction in the turbomachine is embodied by the arrow A.

The heat exchanger 12 includes, in this example, an annular body 18 forming part of the outer fixed structure 14. The heat exchanger 12 is therefore partly integrated into the outer fixed structure 14, the outer surface 18S of the body 18 defining a portion of the structure 14S of the outer fixed structure 14. In other embodiments, the heat exchanger 12 can be partly integrated into the inner fixed structure 16.

The heat exchanger 12 includes fins 20 connected to the body 18. Each fin 20 protrudes from the surface 14S of the fixed outer structure 14 and extends in height into the air circulation channel 10. The fins 20 are preferably mutually parallel. The surface 14S of the outer fixed structure 14 is hereafter called the "support surface."

Figure 2:
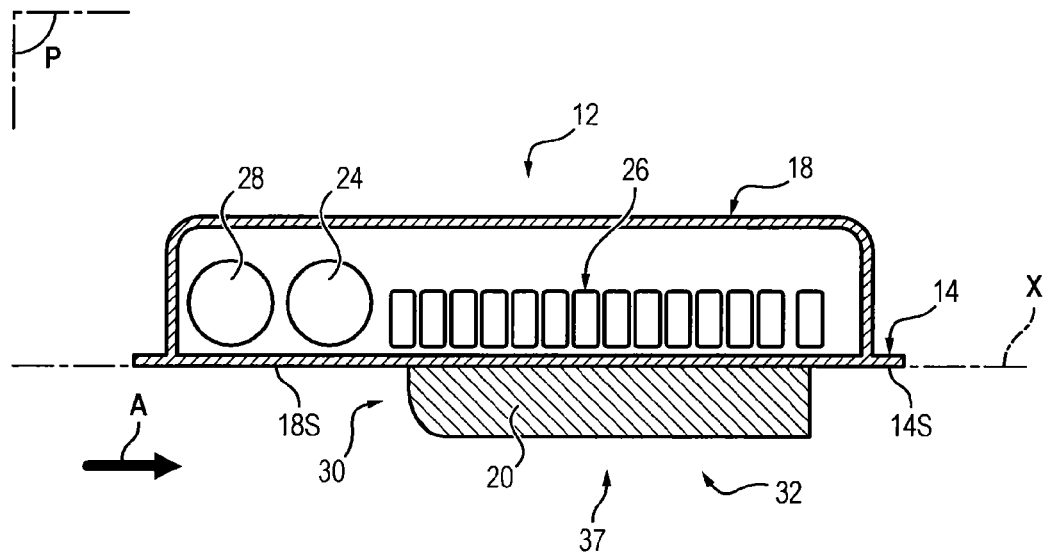
FIG. 2 illustrates a side view of a heat exchanger according to the invention.

FIG. 2 is a side view of the heat exchanger 12 taken in a median plane P perpendicular to the support surface 14S of the heat exchanger 12. This median plane P is a plane of symmetry of the fin P and corresponds to an axial section plane including the principal axis X of the turbojet.

The body 18 of the heat exchanger 12 comprises an entry channel 24 for "hot" oil to be cooled, a plurality of channels 26 wherein the "hot" oil circulates, as well as an exit channel 28 allowing recovery, of "cold" oil. The body 18 of the heat exchanger 12 can, however, include other oil entry, circulation and exit channels.

As can be seen in part in FIGS. 1 and 2, the fins 20 providing for heat exchange between the "hot" oil and the "cold" air circulating in the air circulation channel 10, are arranged circumferentially opposite the inner fixed structure 16 of the exchanger. These fins 20 are attached to the body 18 of the exchanger 12 and protrude from the surface 18S of the body 18, that is with respect to the surface 14S of the outer fixed structure 14 which is the support surface. The fins 20 thus protrude into the air circulation channel 10.

The fins 20 are positioned at the channels 26 for circulation of the "hot" oil. The "hot" oil which arrives in the body 18, and which requires to be cooled, passes through the plurality of circulation channels 26. The heat emitted by the "hot" oil is transferred to each fin 20 protruding into the air circulation channel 10, wherein cold air circulates. Thus, the heat energy "stored" in each fin 20 is transferred via a heat exchange surface of each fin 20 to the cold air.

As illustrated in FIG. 2, each fin 20 includes an upstream end defining a leading edge 30 in the median plane P, facing the air flow, and a downstream end defining the trailing edge 32.

Moreover, as illustrated more specifically in FIG. 2, each fin 20 has two lateral faces 33 connecting the leading edge 30 to the trailing edge 32 (a single lateral face 33 is visible in FIG. 2). Thus, the surface formed by the lateral faces 33 and delimited by the leading edge 30, the trailing edge 32 and the peak 37 of the fin 20 defines a heat exchange surface. The heat exchange surface of each fin 20 is in contact with the "cool" air circulating in the air circulation channel 10, which makes it possible to cool the "hot" oil.

Figure 3:
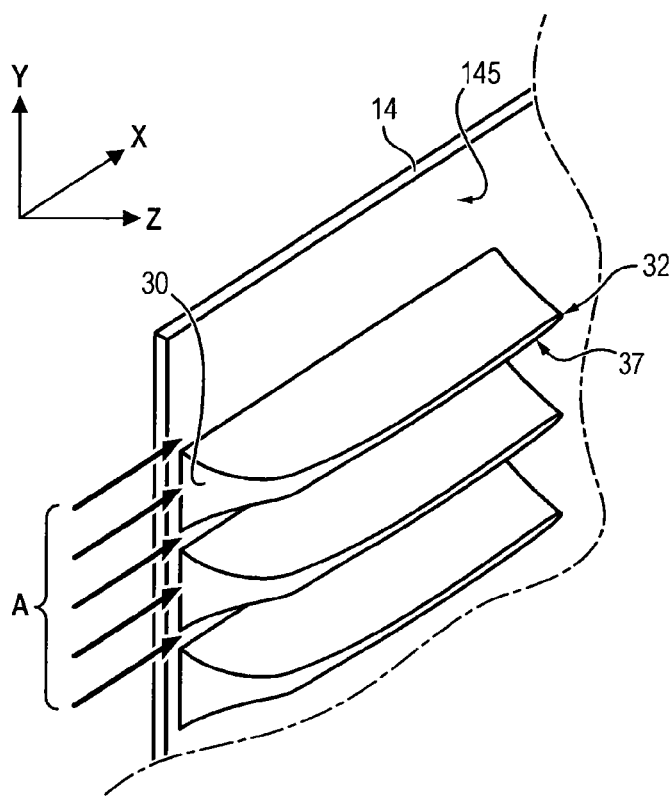
FIG. 3 illustrates a profile view of a heat exchanger according to the invention.
Figure 4:
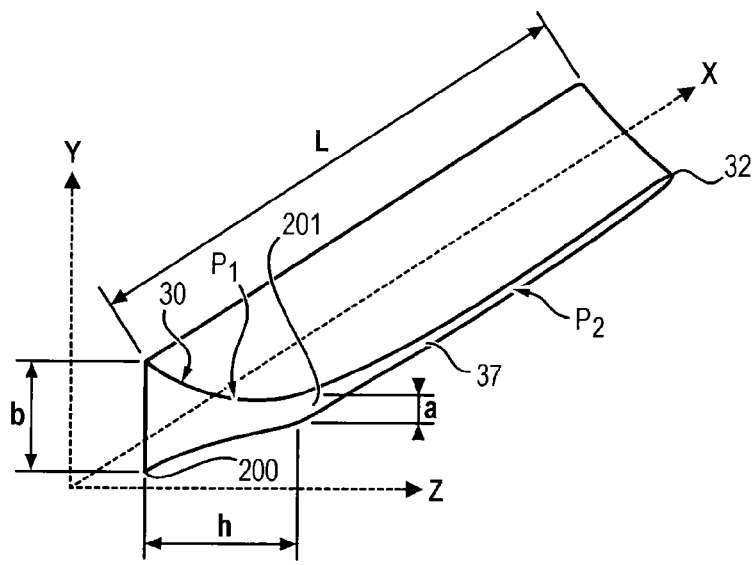
FIG. 4 illustrates a profile view of a fin of an exchanger according to the invention.

In relation to FIG. 3 and FIG. 4, each fin 20 includes a base 200 and a leading face 201, preferably continuous, which extends from the base 200, axially along an axial length L in the air circulation direction while tapering from upstream to downstream along an axis X parallel to the support surface 14, 16.

In particular, still in relation to these figures, the leading face 201 rises from the base 200 of the fin 20 in contact with the support surface 14, 16 up to the maximum height h along an axis z perpendicular to the support surface (above the support surface 14, 16).

The peak of the fin 37 is thus at the height h and the trailing edge 32 is thus at the downstream end of the fin 20.

The base 200 of the fin 20 is preferably rectangular.

As can be seen in FIG. 4, each fin 20 rises in a parabolic profile P1 defined in a median plane P perpendicular to the support surface, the parabolic profile P1 being followed by a straight profile P2 parallel to the support surface. The parabolic profile P1 is either concave or convex.

The trailing edge 32 is of any shape, triangular for example, perpendicular to the base 200 of the fin 20. Thus, as will be understood, the leading face 201 of the fin tapers vertically and horizontally with respect to the support surface of the fin 20.

Figure 5:
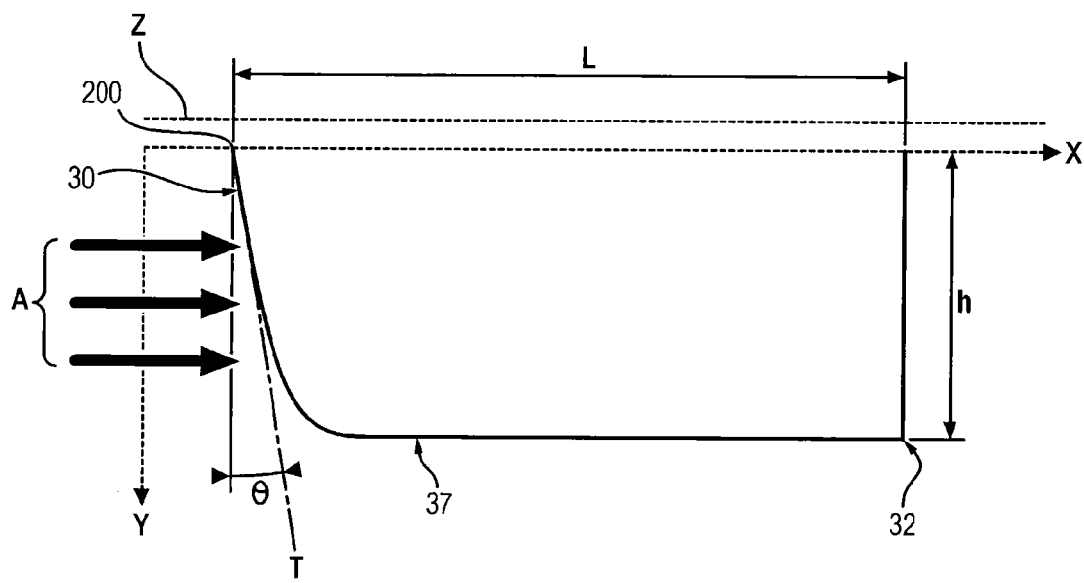
FIG. 5 illustrates a profile view of a fin of an exchanger according to the invention.

In relation to FIG. 5, each fin 20 extends from the leading edge 30, incident to the air circulating in the air circulation channel 10, the leading edge 30 extending from the base 200 of the fin 20, the leading edge being defined by a conic function having a tangent T at the base forming a positive angle θ° with an axis perpendicular to the support surface 14S.

The positive angle θ° with an axis perpendicular to the support surface is comprised between 0° and 60°, typically equal to 30°.

Advantageously, each fin 20 tapers along an axis z perpendicular to the support surface according to the following function $$f(x,z) = b/2 * (1 - z/h)^2 + g(x,z) + \text{const},$$

where b is the width of the base 200 of the fin 20, h the maximum height of the fin 20, const a predetermined value, y an axis perpendicular to the air flow direction and parallel to the support surface, g(x, z) the taper along an axis parallel to the air flow direction (that is to say the profile of the edges of the fin 20) defined by the following function:

$$g(x,z) = a/2 * (1 - x/L)^2 \cdot \delta_{z,h},$$

where a is the width of the fin at the end from which the fin extends only along the axis x parallel to the support surface, y is an axis perpendicular to the air flow direction and parallel to the support surface, L is the axial length of a fin, by is the width of the base of the fin 20, h is the maximum height of the fin 20, and $\delta_{z,h}$ is the Kronecker delta function: $\delta_{z,h}=1$ if and only if z=h and 0 otherwise.

Preferably:
- the axial length L of each fin 20 is comprised between 7 cm and 16 cm;
- the width b of the base 200 of each fin 20 is comprised between 0.5 mm and 1.5 mm;
- the width a of each fin 20 at the end from which each fin extends only along the axis x parallel to the support surface is comprised between 0.2 mm and 1 mm;
- the maximum height h of each fin 20 is comprised between 12 mm and 23 mm.

The invention claimed is:

1. A heat exchanger of an air circulation channel of a turbomachine, the heat exchanger being configured so that a fluid to be cooled passes through the heat exchanger and includes a plurality of fins protruding from a support surface of the turbomachine into the air circulation channel to be in heat exchange relationship with an air flow within the air circulation channel, wherein each fin includes a base and a continuous leading face which extends axially from the base, in an air circulation direction to a trailing edge of the fin, wherein each fin tapers both vertically from the base to a peak of the fin and horizontally from a leading edge of the fin to the trailing edge of the fin such that a spacing between adjacent fins increases from the leading edge to the trailing edge.

2. The heat exchanger according to claim 1, wherein the leading face of each fin rises from the base of said each fin in contact with the support surface up to a maximum height along an axis perpendicular to the support surface.

3. The heat exchanger according to claim 1, wherein each fin rises from the base according to a parabolic profile defined in a median plane perpendicular to the support surface, the parabolic profile being followed by a straight profile parallel to the support surface.

4. The heat exchanger according to claim 3, wherein the parabolic profile is convex or concave.

5. The heat exchanger according to claim 1, wherein each fin extends from the leading edge at incidence to the fluid to be cooled, the leading edge extending from the base of the fin, the leading edge being defined by a conic function having a tangent at the base forming a positive angle with an axis perpendicular to the support surface.

6. The heat exchanger according to claim 5, wherein the positive angle with an axis perpendicular to the support surface is comprised between 0° and 60°.

7. The heat exchanger according to claim 1, wherein each fin tapers along an axis z perpendicular to the support surface according to a function $f(x, z)=b/2*(1-z/h)^2+g(x, z)+$const, where $g(x, z)=a/2*(1-x/L)2 \cdot \delta_{z,h}$ is a taper along an axis x parallel to the air circulation direction, y is an axis perpendicular to the air circulation direction and parallel to the support surface, L is an axial length of a fin, b is a width of the base of the fin, h is a maximum height of the fin, and $\delta_{z,h}$ is a Kronecker delta function.

8. The heat exchanger according to claim 1, wherein the base of each fin is rectangular.

9. A turbomachine including a heat exchanger according to claim 1.

10. The turbomachine according to claim 9, including an air circulation channel delimited between a first fixed annular structure and a second fixed annular structure, the support surface of the heat exchanger being a surface of one of the fixed structures.

11. The heat exchanger according to claim 5, wherein each fin includes two lateral faces connecting the leading edge to the trailing edge at a downstream end of the fin.

12. The heat exchanger according to claim 5, wherein the positive angle with the axis perpendicular to the support surface is equal to 30°.

* * * * *